US009526226B2

(12) United States Patent
Plazarte et al.

(10) Patent No.: US 9,526,226 B2
(45) Date of Patent: Dec. 27, 2016

(54) SELF-CLEANING LITTER BOX (71) Applicant: Sunbeam Products, Inc., Boca Raton, FL (US)

(72) Inventors: Enrique Plazarte, Fort Lauderdale, FL (US); Steve Vernaglia, Boca Raton, FL (US); Carlos Ojeda, Boynton Beach, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 125 days.

(21) Appl. No.: 14/407,090

(22) PCT Filed: Jun. 13, 2013

(86) PCT No.: PCT/US2013/045638
§ 371 (c)(1),
(2) Date: Dec. 11, 2014

(87) PCT Pub. No.: WO2013/188655
PCT Pub. Date: Dec. 19, 2013

(65) Prior Publication Data
US 2015/0173323 A1 Jun. 25, 2015

Related U.S. Application Data (60) Provisional application No. 61/660,135, filed on Jun. 15, 2012.

(51) Int. Cl.
*A01K 1/01* (2006.01)
(52) U.S. Cl.
CPC ............. *A01K 1/0114* (2013.01); *A01K 1/011* (2013.01)

(58) Field of Classification Search
CPC .............................. A01K 1/011; A01K 1/0114
USPC .................................................. 119/163, 166
See application file for complete search history.

(56) References Cited

U.S. PATENT DOCUMENTS

| 3,954,086 A | 5/1976 | Maness |
| 4,117,804 A * | 10/1978 | Moore ................. A01K 1/0114 |
| | | 119/166 |
| 5,003,920 A | 4/1991 | Miksitz |
| 5,048,465 A | 9/1991 | Carlisi |

(Continued)

FOREIGN PATENT DOCUMENTS

WO WO 2012071737 A1 * 6/2012 ............. A01K 1/011

*Primary Examiner* — Stanton L Krycinski
(74) *Attorney, Agent, or Firm* — Seth M. Blum (57) ABSTRACT

The present disclosure is directed towards a self-cleaning litter box. The self-cleaning litter box includes a litter tray having a bottom surface, a first and second side wall, a home end, and a waste end, the bottom surface having an upwardly sloping ramp directed towards the discharge end, A carriage assembly is supported between the first and second side walls, and has a rake positioned thereon. A drive assembly is removably attached to the home end of the litter tray. The drive assembly is operably connected to the carriage assembly to drive the carriage assembly along a path between the home end and discharge end of the litter tray. A waste receptacle positioned adjacent to the discharge end of the litter tray, the waste receptacle includes a selectively openable lid. The drive assembly includes all of the electronics of the litter box. This permits the litter tray to be separated from the drive assembly, and cleaned without damaging the electronics in the drive assembly.

17 Claims, 12 Drawing Sheets (56) References Cited

U.S. PATENT DOCUMENTS

| | | |
|---|---|---|
| 5,226,388 A | 7/1993 | McDaniel |
| 5,272,999 A * | 12/1993 | Nussle ................. A01K 1/0114 119/166 |
| 5,477,812 A | 12/1995 | Waters |
| 5,544,620 A | 8/1996 | Sarkissian |
| 5,749,318 A | 5/1998 | Barbot et al. |
| 5,911,194 A | 6/1999 | Pierson, Jr. |
| 5,931,119 A | 8/1999 | Nissim et al. |
| 6,082,302 A | 7/2000 | Thaler et al. |
| RE36,847 E | 9/2000 | Waters |
| 6,202,595 B1 | 3/2001 | Atcravi |
| 6,205,954 B1 | 3/2001 | Bogaerts |
| 6,378,461 B1 | 4/2002 | Thaler et al. |
| 6,401,661 B1 | 6/2002 | Emery |
| 6,588,369 B2 | 7/2003 | Carlisi |
| 6,701,868 B1 * | 3/2004 | Shepherd ............. A01K 1/0114 119/161 |
| 6,851,386 B2 | 2/2005 | Northrop et al. |
| 6,863,026 B2 | 3/2005 | Northrop et al. |
| 6,951,190 B2 | 10/2005 | Northrop et al. |
| 7,017,519 B1 | 3/2006 | Deasy et al. |
| 7,137,355 B1 | 11/2006 | Wan |
| 7,261,058 B2 | 8/2007 | Gillis et al. |
| 7,263,951 B2 | 9/2007 | Gillis et al. |
| 7,290,499 B2 | 11/2007 | Emery |
| 7,628,118 B1 * | 12/2009 | Nottingham ......... A01K 1/0114 119/166 |
| 7,762,213 B2 | 7/2010 | Cook et al. |
| 7,997,230 B2 | 8/2011 | Cook et al. |
| 8,028,659 B2 | 10/2011 | Cook et al. |
| 8,109,237 B1 | 2/2012 | Tsengas et al. |
| 8,156,895 B2 | 4/2012 | Caputa et al. |
| 8,161,908 B2 | 4/2012 | Cook et al. |
| 8,166,918 B2 | 5/2012 | Cook et al. |
| 8,166,919 B2 | 5/2012 | Cook et al. |
| 8,166,920 B2 | 5/2012 | Cook et al. |
| 8,381,687 B2 * | 2/2013 | Tsengas ............... A01K 1/0114 119/166 |
| 8,683,952 B2 * | 4/2014 | Miller ................. A01K 1/0114 119/165 |
| 9,179,643 B2 * | 11/2015 | Loveday ............... A01K 1/011 |
| 2003/0217700 A1 * | 11/2003 | Northrop ............. A01K 1/0114 119/166 |
| 2004/0129233 A1 | 7/2004 | Northrop et al. |
| 2007/0056520 A1 | 3/2007 | Hamada |
| 2007/0056521 A1 * | 3/2007 | Caputa ................. A01K 1/0114 119/166 |
| 2011/0017142 A1 | 1/2011 | Tsengas |
| 2011/0155072 A1 | 6/2011 | Cook et al. |
| 2011/0265728 A1 | 11/2011 | Cook et al. |
| 2011/0315084 A1 | 12/2011 | Miller |

* cited by examiner

SELF-CLEANING LITTER BOX

FIELD OF THE INVENTION

The invention relates generally to cat litter boxes, and, more particularly, to an automatic, self cleaning, litter box.

BACKGROUND OF THE INVENTION

House cats are typically trained to use a litter box for elimination of both liquid and solid wastes. A cat litter box is normally made of a no absorbent material for supporting litter therein. The litter material may be one of any number of particulate litter materials that absorb moisture from the waste of the cat and that may also suppress odor from cat wastes. Some forms of litter material form clumps when wet.

The waste in the litter boxes must be discarded regularly, in some instance on a daily basis. However, ever after minimal use the waste may result in a strong, unpleasant odor. As such, the person cleaning litter box may find this to be an unpleasant task.

As such, a number of apparatus have been developed for the self cleaning of litter boxes. These self-cleaning cat litter boxes may include a rake or comb that is normally maintained in a storage position at one end of the litter box. This comb is moved through the litter material in the litter box, periodically, from the storage position at one end of the litter box to the opposite end, which constitutes a discharge end for the litter box. At the discharge end of the litter box the rake can move up, out of the litter material, discharging any clumps of waste collected by the rake into a disposal receptacle. Upon completion, the rake moves back to the storage position.

SUMMARY OF THE INVENTION

The present disclosure provides a self-cleaning litter box. The self-cleaning litter box includes a litter tray having a bottom surface, a first and second side wall, a home end, and a waste end, where the bottom surface has an upwardly sloping ramp directed towards the discharge end. A carriage assembly is supported between the first and second side walls, and includes a rake positioned thereon. A drive assembly is removably attached to the home end of the litter tray, where the drive assembly is operably connected to the carriage assembly to drive the carriage assembly along a path between the home end and discharge end of the litter tray. A waste receptacle is positioned adjacent to the discharge end of the litter tray, the waste receptacle having a selectively openable lid.

The drive assembly is removably mounted to an outer wall of the home end of the litter tray, and includes a drive motor connected to a drive gear. The drive gear of drive assembly engages a drive coupler on the home end of the litter tray. The drive coupler is connected to a pair of drive screws position along the side walls of the litter tray. The drive gears engagement of the drive coupler transfers the rotational motion of the drive gear to the drive screws.

The carriage assembly is operably connected to the drive screws so that a rotation of the drive screws in a first direction linearly translates the carriages assembly from the home position, storage position, to the discharge position, and a rotation of the drive screws in a second direction linearly translates the carriages assembly from the discharge position to the home position.

The drive assembly further includes a control system having a processor and a control panel for controlling the operation of the drive motor. The control panel can be used to select a cleaning cycle time interval of the carriage assembly. The cleaning cycle time interval is the time interval between automatic cleaning cycles, namely, an activation of the drive motor to cycle the carriage assembly from the home end, storage position, to the discharge end, to remove cat waste from the litter tray, from the discharge end to the home end. The cleaning cycle time interval can be selected from a set of preset cleaning cycle time intervals. For example, the cleaning cycle time interval can selected from a set of preset time intervals of every 2, 3, 4, 5, or 6, hours stored on the processing unit The drive assembly can also include a cat presence sensor connected to the processor. The cat presence sensor can be used to detect the presence of a cat located in the litter tray within a predetermined time before the initiation of the cleaning cycle. If a cat is detected in the litter tray within the predetermined time period the cleaning cycle is skipped.

A feature of the disclosed drive assembly is that all of the electronics of the litter box are located within/on the drive assembly. This permits the litter tray to be separated from the drive assembly, and cleaned without damaging the electronics in the drive assembly.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
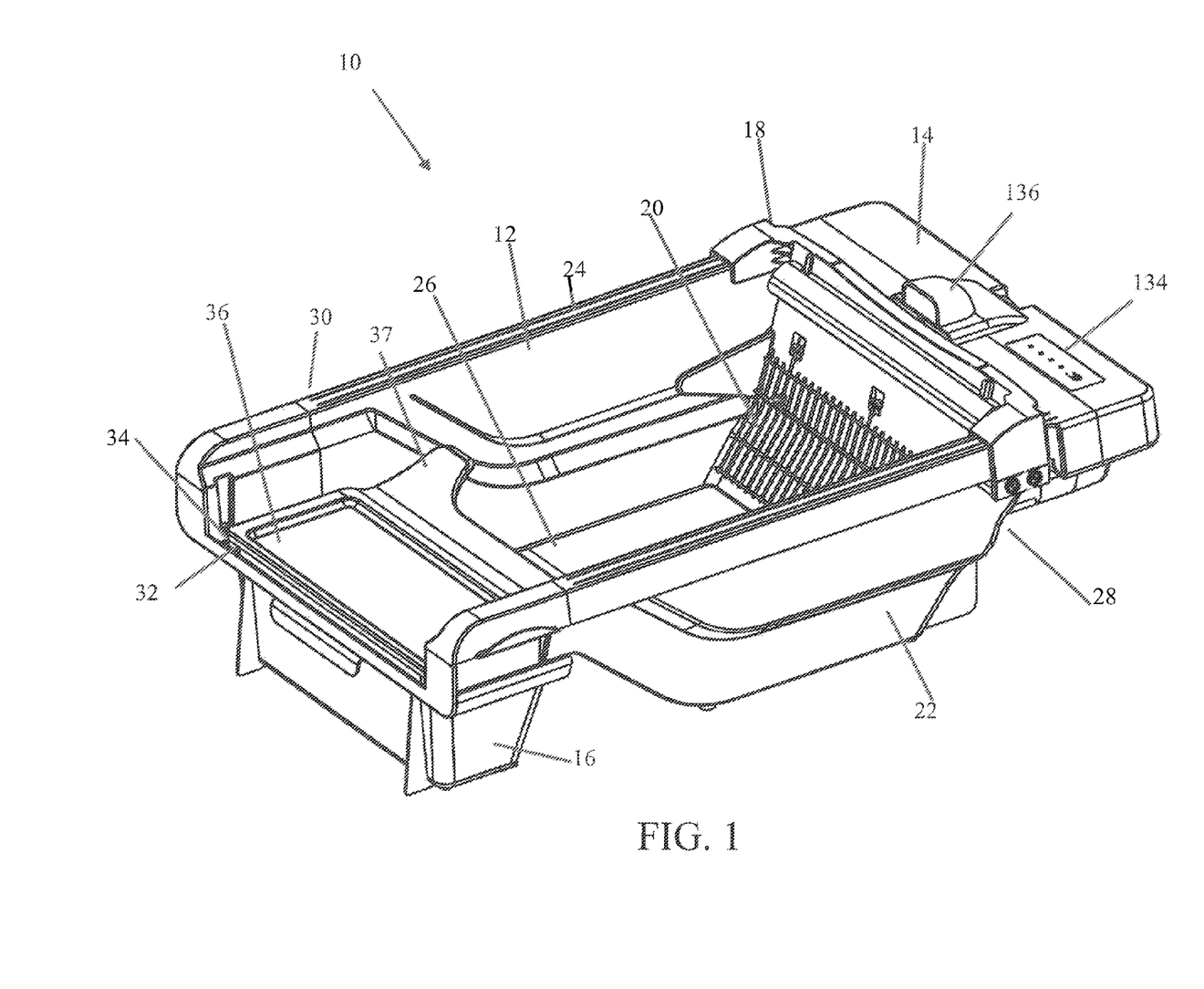
FIG. 1 depicts an isometric view of the self-cleaning litter box of the present disclosure.
Figure 2:
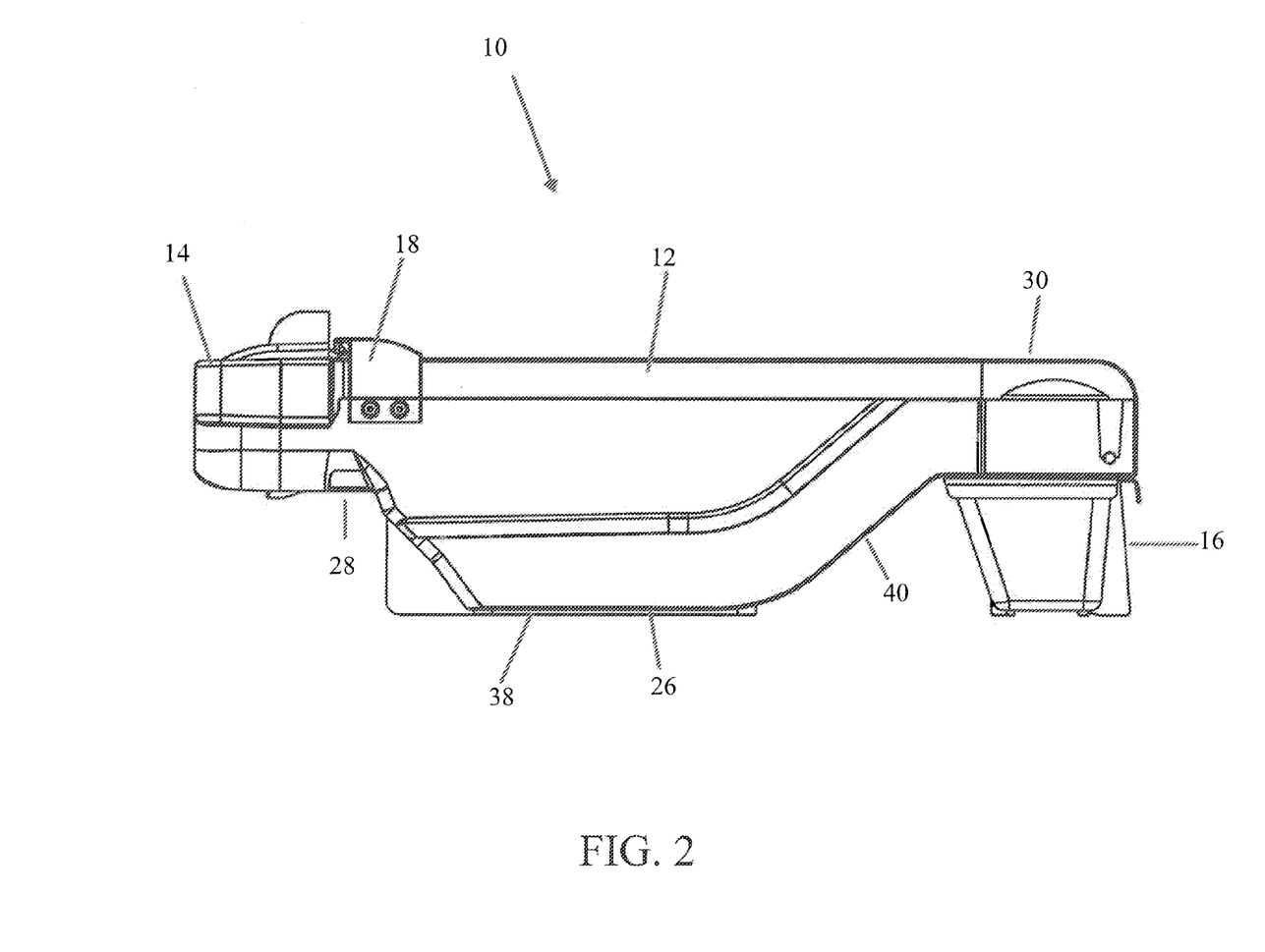
FIG. 2 depicts a side view of the self-cleaning litter box of FIG. 1.
Figure 3:
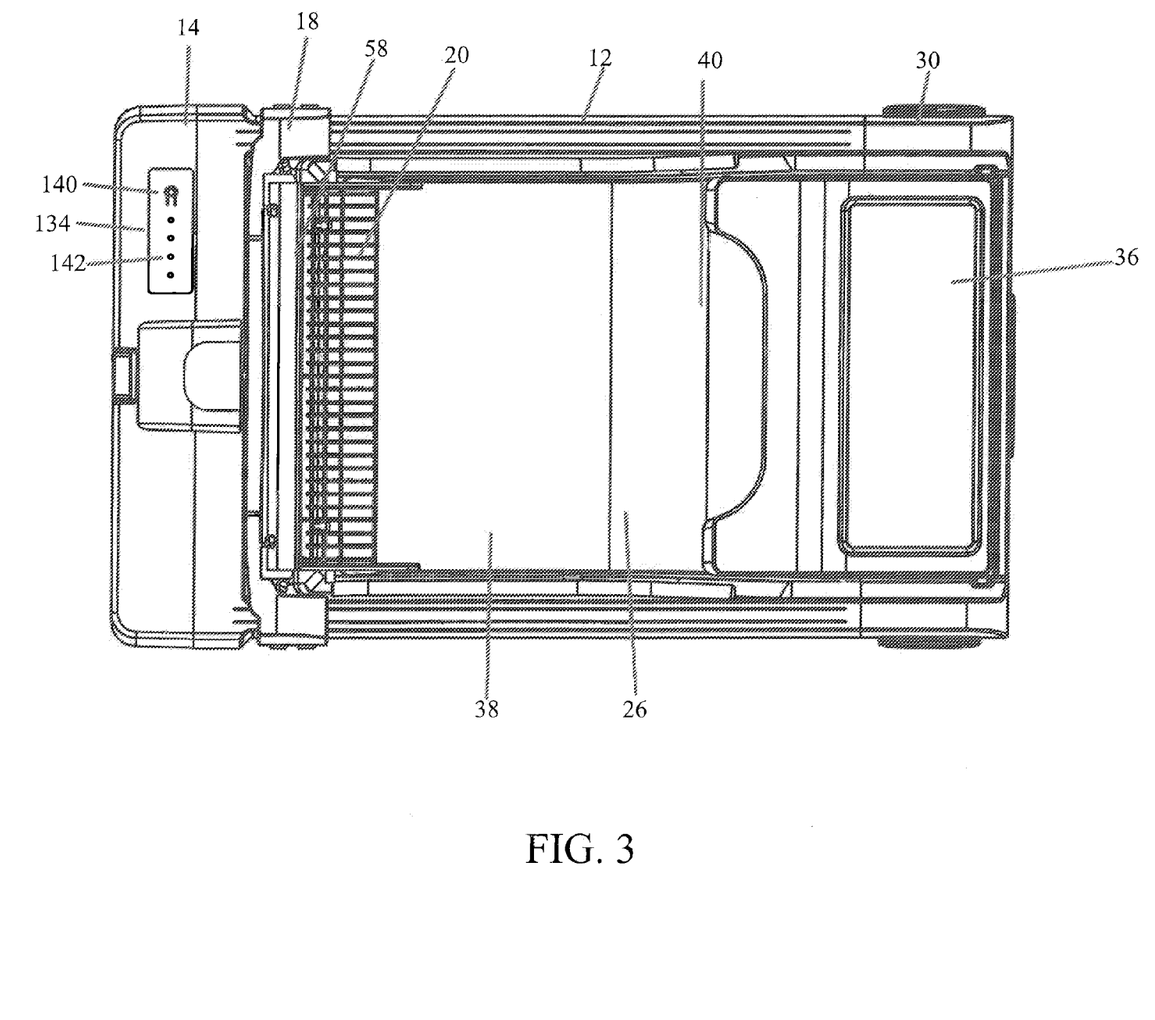
FIG. 3 depicts a top view of the self-cleaning litter box of FIG. 1.

Referring now to the drawing figures in which like reference designators refer to like elements, there is shown in FIGS. 1-3 a self cleaning litter box 10 of the present disclosure. The self cleaning litter box 10 includes a litter tray 12, a drive assembly 14, and a waste receptacle 16, where the drive assembly 14 and the waste receptacle 16 are positioned on opposing ends of the litter tray 12. A carriage assembly 18, including a rake 20, is positioned in the litter tray 12 and is operably connected to the drive assembly 14, such that the carriage assembly 18 can traverse the litter tray 12, moving the rake 20 through litter material in the litter tray 12 to remove cat waste from the litter material and into the waste receptacle 16.

The litter tray 12 can be rectangular in shape, having a pair of parallel side walls 22, 24, a bottom wall 26, a first end 28, and a second end 30. The drive assembly 14 can be removably mounted to the first end 28, home end, of the litter tray 12 and the waste receptacle 16 can be removable positioned adjacent to the second end 30, discharge end, of the litter tray 12. In this manner, to remove cat waste from the litter tray 12 a cleaning cycle is performed where the carriage assembly 18 travels from a storage position at the home end 28 to the discharge end 30 during a cleaning stroke, then from the discharge end 30 to the home end 28 during a return stroke.

The waste receptacle 16 can be positioned under the bottom 32 of the litter tray 12, adjacent to an open portion 34 of the discharge end 30 of the litter tray 12, providing support to the litter tray 12. A rotatable lid 36 can be connected to the discharge end 30, covering the open portion 34 of the discharge end 30 of the litter tray 12. The rotatable lid 36 is rotatable from a closed position, covering the waste receptacle 16, to an opening position, allowing access to the waste receptacle 16 through the open portion 34 of the discharge end 30. The rotatable lid 36 can include a bias member, which biases the receptacle lid 36 in the closed position.

Alternatively, a sliding lid (not shown) can be connected to the discharge end 30, covering the open portion 34 of the discharge end 30 of the litter tray 12. The sliding lid moves in a linear manner from a closed position, covering the waste receptacle 16, to an opening position, allowing access to the waste receptacle 16 the open portion 34 of the discharge end 30. The sliding lid can include a bias member, which biases the receptacle lid 36 in the closed position.

The bottom wall 26 of the litter tray 12 includes a substantially horizontal portion 38, forming a base support surface of the litter tray 12, and an upwardly sloped (ramped) portion 40 extending between the horizontal portion 38 and the discharge end 30. The horizontal portion 38 of the litter tray 12 can be sufficiently deep to accommodate a sufficient depth of litter material, for example, at least 3 inches of litter material.

Figure 4:
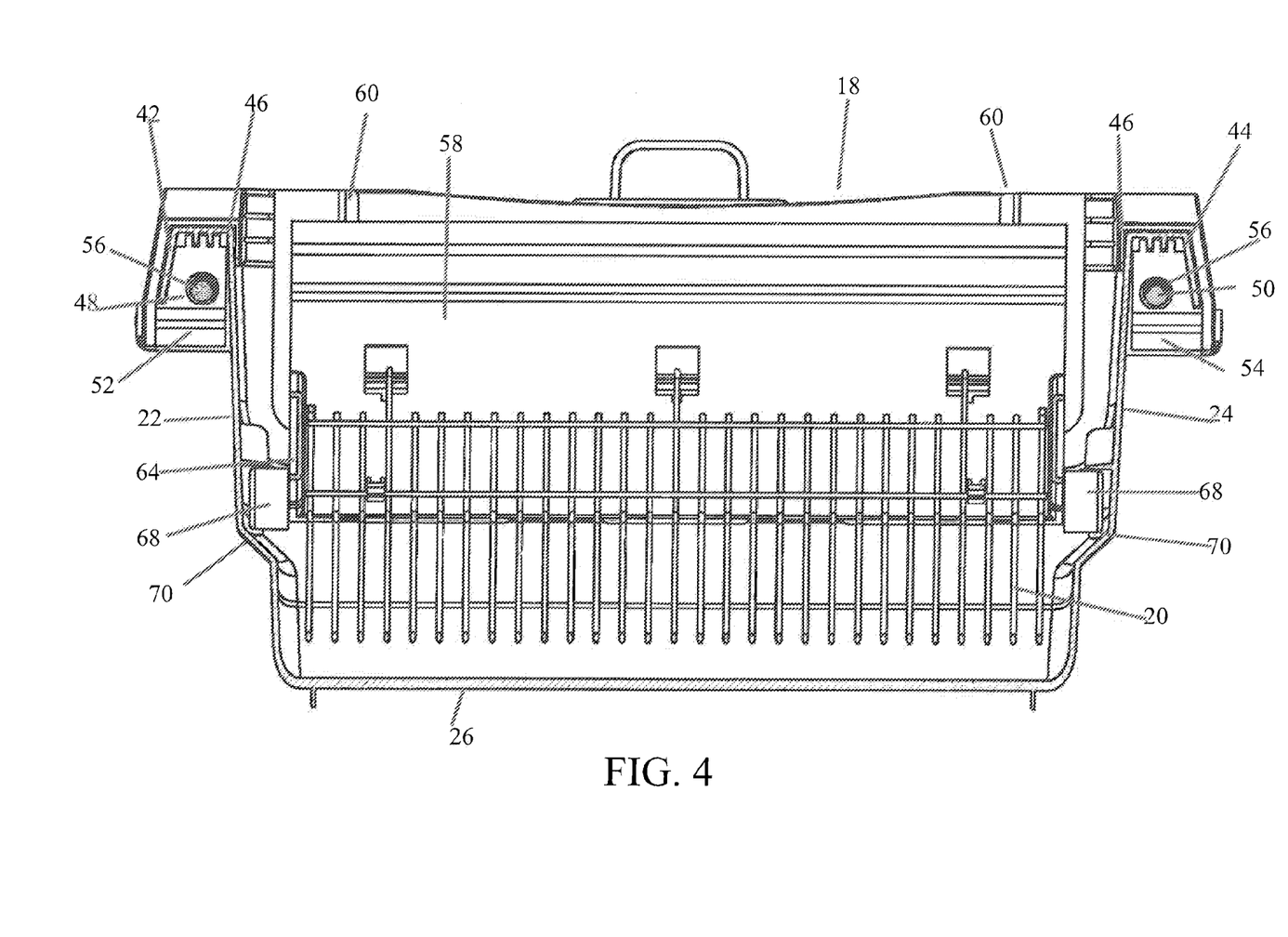
FIG. 4 depicts a front sectional view of the self cleaning litter box of FIG. 1.
Figure 5:
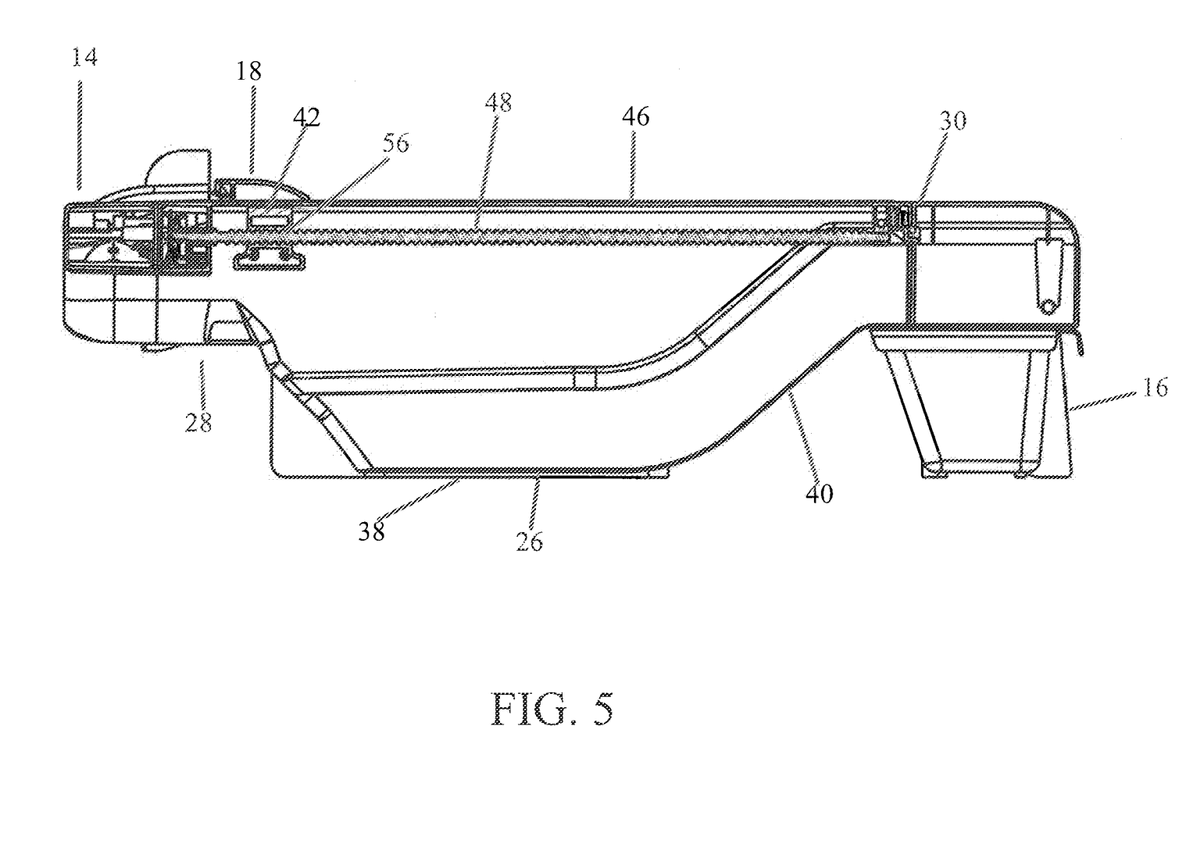
FIG. 5 depicts a side sectional view showing a drive screw of the self-cleaning litter box of FIG. 1.

Referring to FIGS. 4-5, the side walls 22, 24, of the litter tray 12 can include channel portions 42, 44 extending outwardly from, and along, a top edge 46, of the side walls 22, 24. The channel portions 42, 44 can extend from the home end 28 to the discharge end 30 of the litter tray 12. At least one threaded drive screw 48 is positioned through the channel portion 22 or 24 and is operably connected to the drive assembly 14, where the drive assembly rotates the drive screw 48 about its longitudinal axis. Alternatively, two threaded drive screws 48, 50 can be positioned through the channel portions 42, 44, one positioned in each channel portion 42, 44, where each of the drive screws 48, 50 is operably connected to the drive assembly 14, such that the drive assembly rotates the drive screws 48, 50 about their longitudinal axis in unison.

The carriage assembly 18 is positioned within the litter tray and operably connected to the drive screws 48, 50. The carriage assembly 18 includes carriage travel members 52, 54 positioned in the channel portions 42, 44 of the side wall 22, 24, and each having a threaded portion 56 through which the drive screw 48, 50 is positioned. The threaded portion 56 of the carriage travel members 52, 54 engage the drive screws 40. 50 and transfers their rotational motion to a linear motion of the carriage assembly 18. In this manner, a rotation of the drive screws 48, 50 in a first direction linearly translates the carriages assembly 18 from the home position 28, storage position, to the discharge position 30, and a rotation of the drive screws 48, 50 in a second direction linearly translates the carriages assembly 18 from the discharge position 30 to the home position 28.

Figure 6:
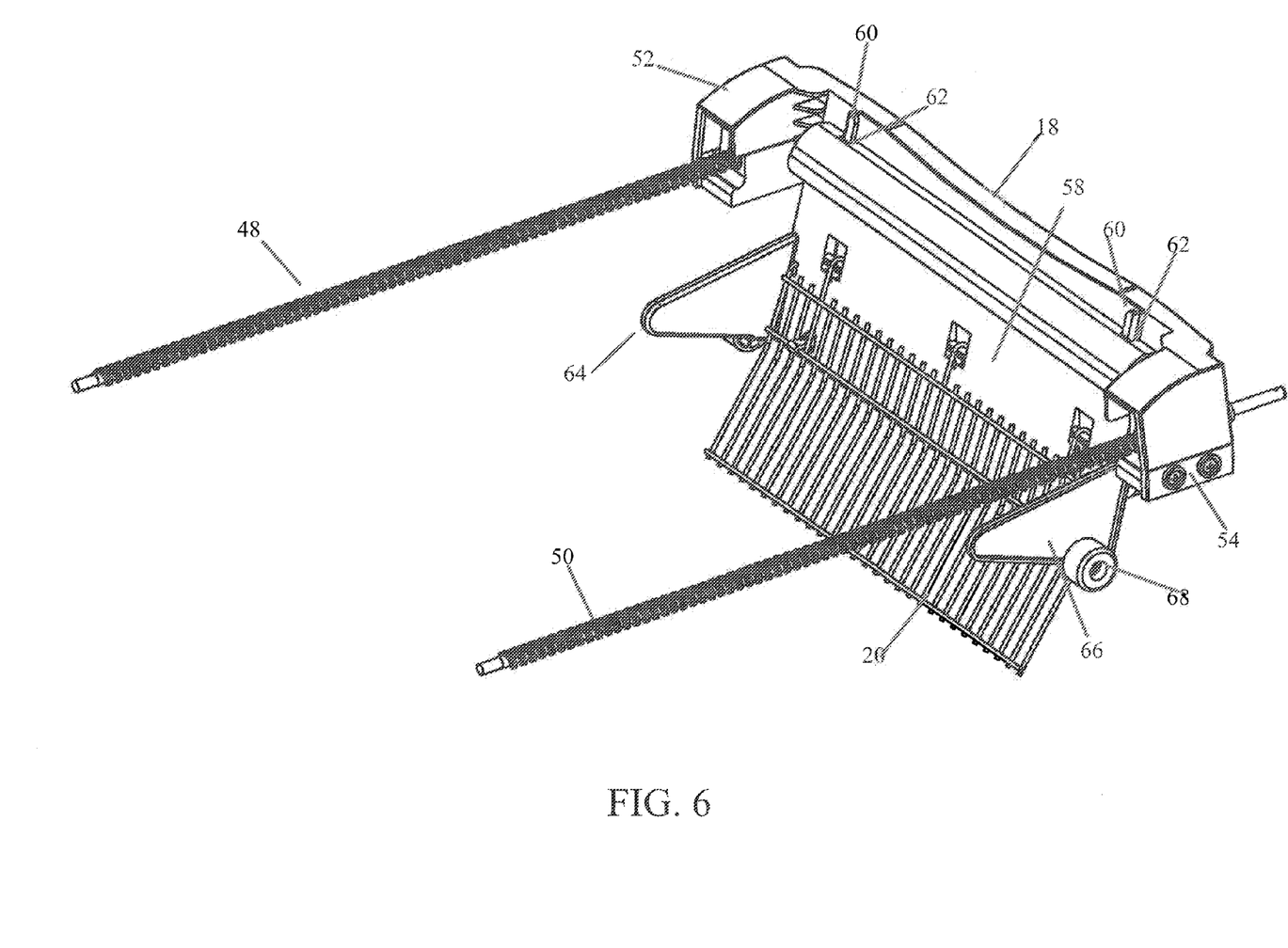
FIG. 6 depicts an isometric view of the carriage assembly of the self-cleaning litter box of FIG. 1.
Figure 7:
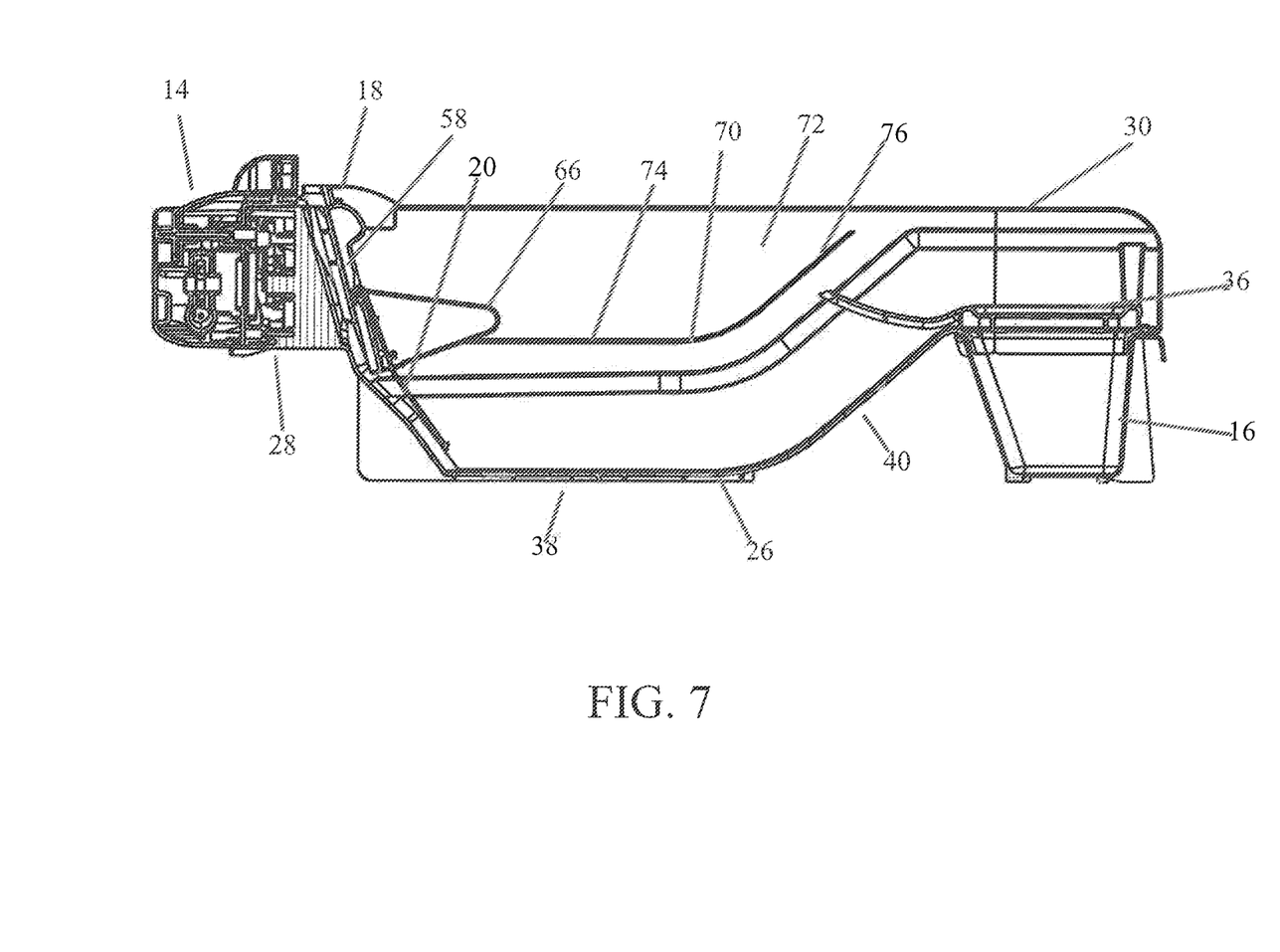
FIG. 7 depicts a side sectional view of the self-cleaning litter box of FIG. 1.

Referring also to FIGS. 6 and 7, the carriage assembly 18 includes a rake support 58 slidably attached thereto, to allow the rake support 58 to freely move in a vertical direction with respect to carriage assembly 18. The carriage assembly 18 includes support guides 60 which are slidably positioned in vertical channels 62 on a back surface 64 of the rake support 58. The support guides 60 and vertical channels 62 constrain the rake support 58 to the carriage assembly 18, allowing the rake support 58 to move in a vertical direction with respect to the carriage assembly 18.

The rake support 58 further includes rake support guides 64, 66 positioned on opposite ends of the rake support 58. The rake support guides 64, 66 each have a guide wheel 68 for engaging a guide rail 70 on the inner surface 72 of the side walls 22, 24 of the litter tray 12. The guide rails 70 can include a substantially horizontal portion 74, corresponding to the horizontal portion 38 of the litter tray 12, and an upwardly sloped portion 76, corresponding to the upwardly sloped portion 40 of the litter tray 12. In this manner, as the carriage assembly 18 travels from the home position 28, storage position, to the discharge position 30, the guide wheels 68 travels along the guide rails 70. As the guide wheels 68 travel along the horizontal portion 74 of the guide rails 70, the position of the rake support 58 will remain substantially unchanged with respect to the carriage assembly 18. As the guide wheels 68 travel along the upwardly sloped portion 76 of the guide rails 70, the rake support 58 will be vertically displaced with respect to the carriage assembly 18.

The rake 20 is connected to a front surface 70 of the rake support 58. The rake 20 includes a plurality of tines 80 which extend downward towards the bottom wall 26 of the litter tray 12, where the bottom ends 82 of the tines 80 are adjacent to, but not in contact with, the bottom wall 26 of the litter tray 12. The tines 80 of the rake 20 can have a circular cross section. Alternatively, the tines 80 can have a polygon cross section, for example, a rectangular cross section, triangular cross section, rhombus cross section, and the like. The rake 20 can be made of a rigid material, for example, metal, plastic, and the like.

In use, as the carriage assembly 18 travels from the home position 28, storage position, to the discharge position 30, the guide wheels 68 of the rake supports 64, 66 will travel along the guide rails 70. As the guide wheels 68 travel along the horizontal portion 74 of the guide rails 70, the position of the rake support 58 will remain substantially unchanged with respect to the carriage assembly 18, with the ends 82 of the rake tines 80 remaining adjacent to the horizontal portion 38 of the bottom wall 26 of the litter tray 12. As the guide wheels 68 travel along the upwardly sloped portion 76 of the guide rails 70 the rake support 58 will be vertically displaced with respect to the carriage assembly 18, with the end 82 of rake tines 80 traveling adjacent to, but not being in contact with, the upwardly sloped portion 40 of the bottom wall 26 of the litter tray 12.

In an embodiment, a biased member (not shown) is positioned between the carriage assembly 18 and the rake support 58. The biased member is positioned to provide a downward force to the rake support 58 with respect the carriage assembly 18, pushing the tines 80 of the rake 20 into the litter material in the litter tray 12, keeping the ends 82 of the rake tines 80 adjacent to, but not in contact with, the bottom wall 26 of the litter tray 12.

In addition, as the carriage assembly 14 travels from the home position 28 to the discharge 30 position, the rake support guide 64 or 66 engage an extended lip 37 on the rotatable lid 36 to rotate the rotatable lid 36 to an open position. Specifically, as the carriage assembly 14 travel up the upwardly sloped portion 76 of the guide rails 70, the rake support guide 64 or 66 engage the extended lip 37 on the rotatable lid 36 rotating the rotatable lid 36 to the open position. As the carriage assembly 14 travels from the discharge position 30 to the home position 28, the carriage assembly 14 travels down the upwardly sloped portion 76 of the guide rails 70, the rake support guide 64 or 66 disengage the extended lip 37 on the rotatable lid 36 allowing the rotatable lid 36 to rotate to the closed position.

Figure 8:
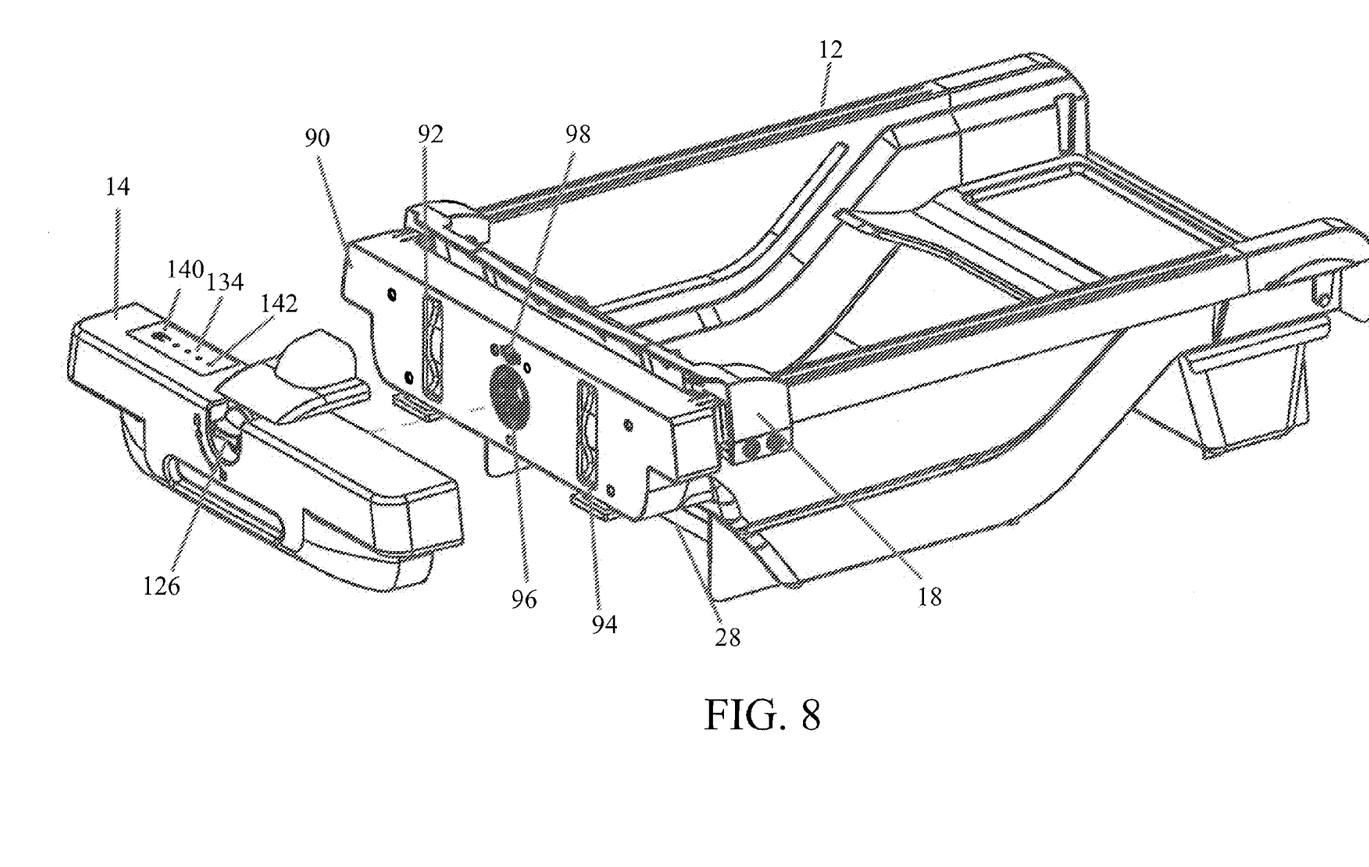
FIG. 8 depicts an exploded view of the drive assembly from the litter tray the self cleaning litter box of FIG. 1.
Figure 9:
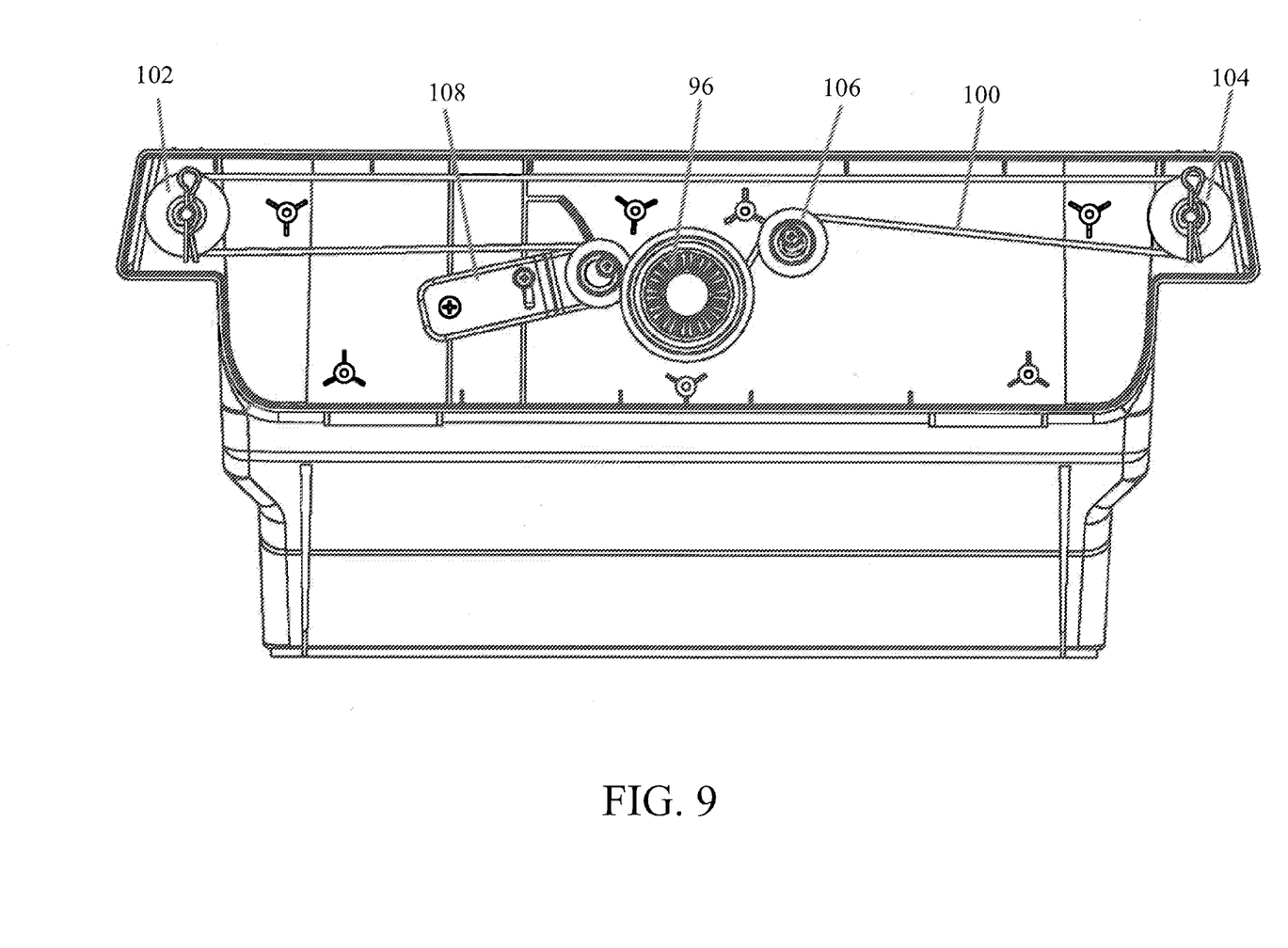
FIG. 9 depicts a rear sectional view of the litter tray of the self-cleaning litter box of FIG. 1.

Referring to FIGS. 8 and 9, the drive assembly 14 can be removably attached to the home end 28 of the litter tray 12. The home end 28 of the litter tray 12 includes an outer mounting wall 90 having a pair of mounting guide receptacles 92, 94 and drive coupler 96. A locking receptacle 98 is further included to secure to the drive assembly 14 to the mounting wall 90.

The drive coupler 96 is operably connected to the drive screws 48, 50 with a drive belt 100. An end of each drive screw 48, 50 is connected to a belt gear 102, 104 about which the drive belt 100 is positioned. A tensioning wheel 106 and automatic tensioner 108 are used to maintain the tension in the drive belt 100 to prevent slipping of the drive belt 100 about the belt gears 102, 104. In this manner, as the drive coupler 96 rotates the drive belt 100 will cause the belt gears 102, 104, drive screws 48, 50, to rotate in unison. The drive coupler 96 can be rotated in a first direction to rotate the belt gears 102, 104 and drive screws 48, 50 to linearly translate the carriages assembly 18 from the home position 28 to the discharge position 30, and in a second direction to rotate the drive gears 102, 104 and drive screws 48, 50 to linearly translate the carriages assembly 18 from the discharge position 30 to the home position 28.

Figure 10:
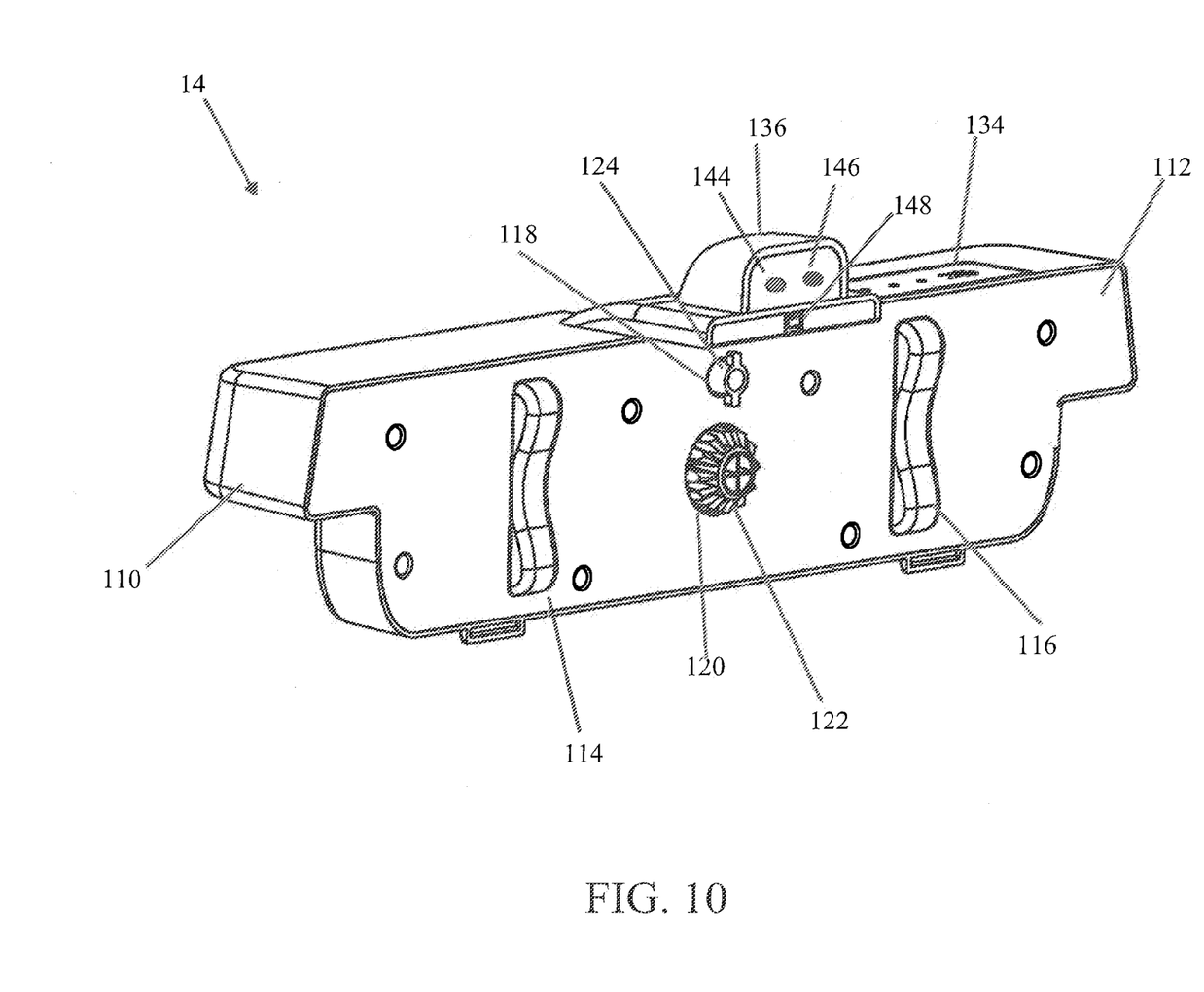
FIG. 10 depicts a front isometric view of the drive assembly of the self cleaning litter box of FIG. 1.
Figure 11:
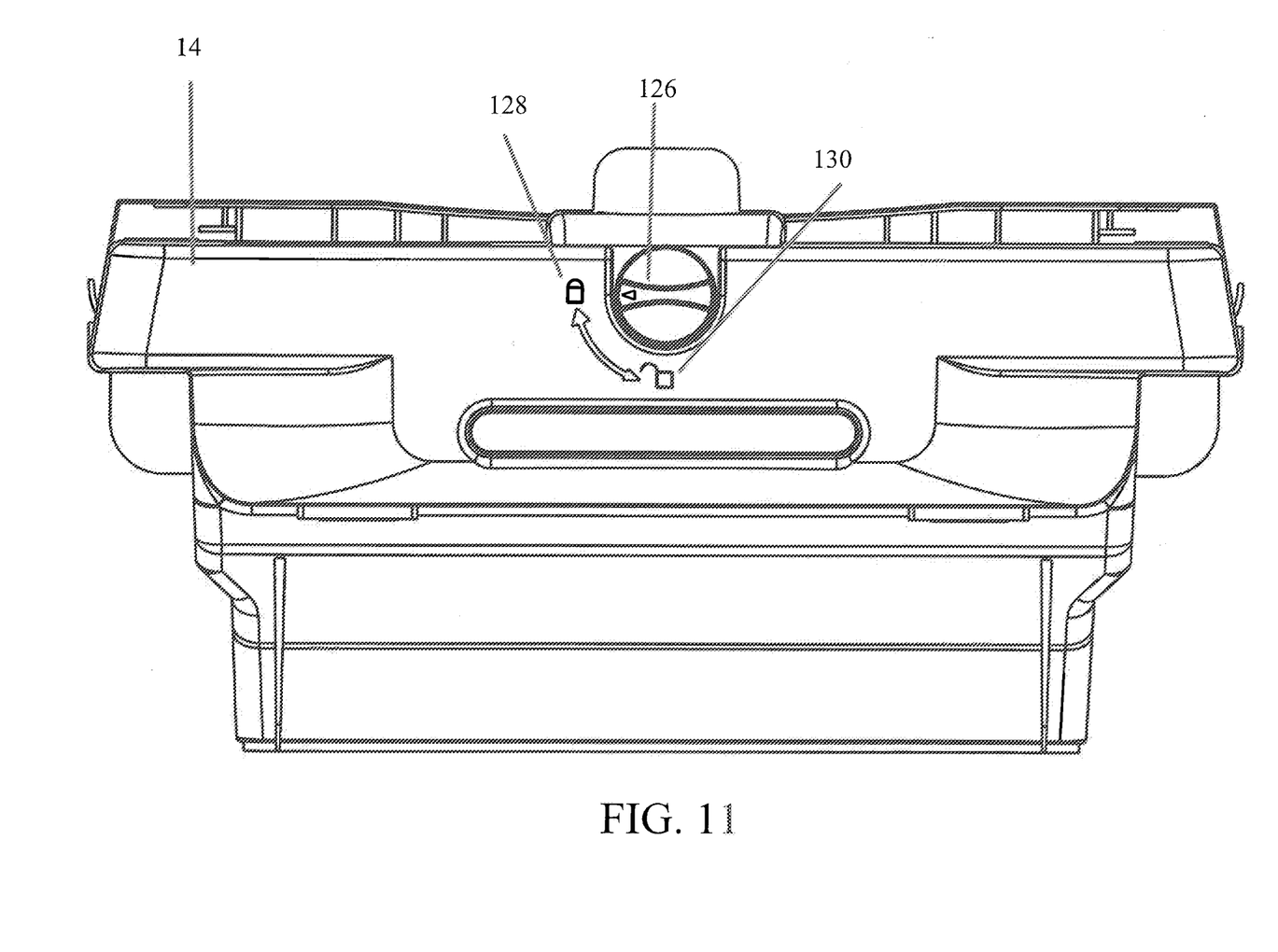
FIG. 11 depicts a rear view of the self-cleaning litter box of FIG. 1.

Referring also to FIGS. 10 and 11, the drive assembly 14 includes a drive housing 110 and a drive mounting wall 112. The drive mounting wall 112 has a pair of mounting guides 114, 116, and apertures 118, 120 through which a drive gear 122 and locking key 124 extend. To connected the drive assembly 14 to the litter tray 12 the drive mounting wall 112 is positioned against the outer mounting wall 90 of the litter tray 12. The pair of mounting guides 114, 116 are received within the mounting guide receptacles 92, 94 and the drive gear 122 engages the drive coupler 96 on the outer mounting wall 90 of the litter tray 12.

The engagement of the drive gear 122 to the drive couple 96 can be performed by the teeth of the drive gear 122 engaging the receiving teeth receptacles of the drive coupler 96. Alternatively, the engagement of the drive gear 122 to the drive coupler 96 can be a frictional engagement, or other know types of engagement which ensure that the rotation of the drive gear 112 is transferred to the drive coupler 96.

The mounting guides 114, 116 and mounting guide receptacles 92, 94 are depicted as being in a vertical linear orientation. However, it is contemplated that the mounting guides 114, 116 and mounting guide receptacles 92, 94 can be provide in other orientations, including, horizontal, angular, and curved.

The drive assembly 14 is secured to the outer mounting wall 90 by inserting the locking key 124 in the locking receptacle 90. The locking key 124 is connected to a knob 126 which can be rotated to a locked position 128, such that the locking key 124 engages the locking receptacle 98. The drive assembly 14 can be removed from the litter tray 12, by rotating the knob 126 to the unlocked positioned 130 allowing the drive assembly 14 to be separated from the litter tray 12.

The above locking assembly is exemplary in nature and it is contemplated, the other know locking assemblies are contemplated.

Figure 12:
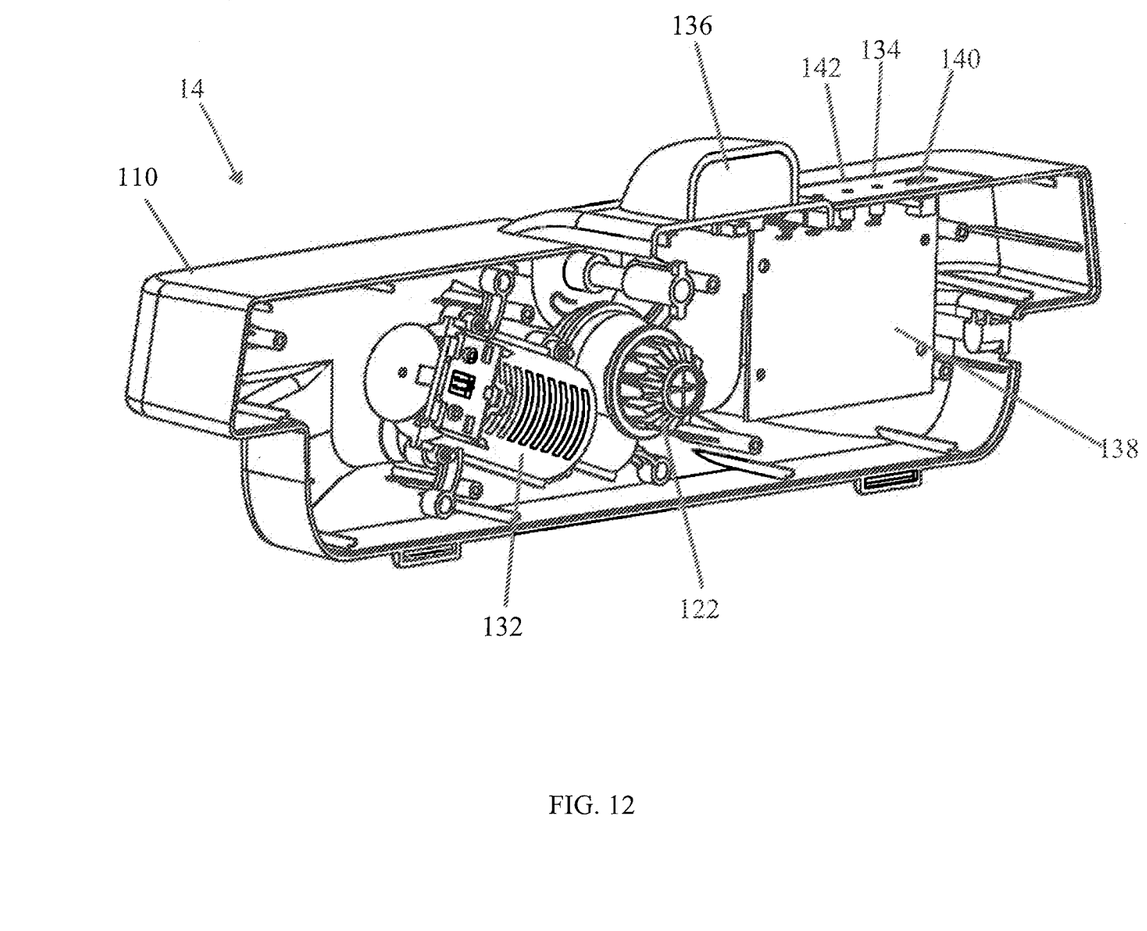
FIG. 12 depicts a front sectional view of the drive assembly of FIG. 10.

Referring also to FIG. 12, the drive assembly 14 includes a reversible electric drive motor 132 connected to the drive gear 122. The operation of the drive motor 132 can be controlled by a control panel 134 and sensor assembly 136 connected to a processing unit 138. A power cord is connected to the processor 138 to provide electrical power to the drive assembly 14. Alternatively, electrical power can be provided by a battery system.

The control panel 134 includes an ON/OFF switch 140 which can be used to select a cleaning cycle time interval of the carriage assembly 18. The cleaning cycle time interval is the time interval between automatic cleaning cycles, namely, an activation of the drive assembly 14 to cycle the carriage assembly 18 from a home end 28, storage position, to the discharge end 30, to remove cat waste from the litter tray 12, and from the discharge end 30 to the home end 28, storage position.

A user actuates the ON/OFF switch 140 to turn the drive assembly 14 ON, and select the cleaning cycle time interval from a set of preset cleaning cycle time intervals. For example, the cleaning cycle time interval can be selected from a set of preset time intervals of every 2, 3, 4, 5, or 6, hours stored on the processing unit 138. When the drive assembly 14 is OFF, a first actuation of the ON/OFF switch 140 will turn the drive assembly 14 ON and select the first present cleaning cycle time interval, namely, every 2 hours. Each subsequent actuation of the ON/OFF switch 140 will set the cleaning cycle time interval to the next preset cleaning cycle time interval. Upon reaching to the last preset cleaning cycle time interval, namely, every 6 hours, a further actuation of the ON/OFF switch 140 will turn the drive assembly OFF.

The listed set of preset time intervals are exemplary in nature and it is contemplated, the other sets or preset time intervals can be utilized.

The ON/OFF switch 140 can also be used to manually active a cleaning cycle. Specifically, each actuation of the ON/OFF switch 140 will initiate a cleaning cycle. As such, when the ON/OFF switch 140 is actuation from OFF, a cleaning cycle is initiated. Additionally, when the ON/OFF switch 140 is actuation to change the selected preset cleaning cycle time interval a cleaning cycle is initiated.

The ON/OFF switch 140 can be a depression button, the pressing of which will actuation the switch 140. The control panel 134 can further include a plurality of lighted indicators 142. The lighted indicators 142 can be used to show the status of the litter box 10, ON or OFF, or the selected preset cleaning cycle time interval.

The sensor assembly 136 can include a cat presence sensor 144. The cat presence sensor 144 is used to detect the presence of a cat in the litter tray 12. Specifically, if the cat presence sensor 144 detects a cat in the litter tray 12 within a predetermined time before the initiation of an automatic cleaning cycle, that specific cleaning cycle will be skipped. For example, when the predetermined time is set to ten (10)

minutes, if a cat enters the litter tray 12 at any time within the predetermined time and the initiation of a preset cleaning cycle, that cleaning cycle will be skipped.

The sensor assembly 136 can further include a second sensor 146 to detect the presence of a cat in the litter tray 12 between the carriage assembly 18 and the home end 38 of the litter tray 12. In use, if a cat is detected in the litter tray 12 between the carriage assembly 18 and the home end 28 of the litter tray 12 during a cleaning cycle, the processor 138 will stop the movement of the carriage assembly 18 until the cat leaves this region.

The litter box 10 may also include a Sleep Mode, the setting of which prevents the occurrence of a cleaning cycle during a set time period, for example during the night.

The processing unit 138 can include a current monitoring system that monitors the electric current in the drive motor 132. Should the current in the drive motor 132 exceed a predetermined level the current monitoring system will disable the drive motor 132. In event such an event, the lighted elements 142 on the control panel 134 can blink to indicate a problem. Additionally, the control panel 134 can further include a buzzer, which is activated to indicate a problem.

In order to manage the position of the carriage assembly 18 during a cleaning stroke and a return stroke, the processor 138 can include a position monitoring system. The position monitoring system determines the position of the carriage assembly 18 based on the rotation of the drive motor 132. The position monitoring system counts the rotation of the motor during the cleaning stroke, continually comparing the count to a know number of rotations required for the carriage assembly to travel from the home end 28 to the discharge end 30. When the counted motor rotations equal the know number of rotations the processor stops the drive motor 132. The processor 138 will then reverse the drive motor 132 to return the carriage assembly 18 to the home position 28. The position monitoring system counts the rotation of the motor during the return stroke, continually comparing the count to a know number of rotations required for the carriage assembly to travel from the discharge end 30 to the home end 28. When the counted motor rotations equal the know number of rotations the processor stops the drive motor 132. Upon completing a cleaning cycle, the processor 138 resets the motor rotation count to zero.

Alternatively, the drive assembly 14 can include a shut-off switch 148 connected to the processor 138. The shut-off switch 148 is positioned to be adjacent to the carriage assembly 18 when at the home end 28, and is used to determine when the carriage assembly 18 reaches the home end 28 on the return stoke. On reaching the home end, 28, the carriage assembly 18 will engage the shut-off switch 148 indicating the completion of a cleaning cycle. The processor 138 then resets the motor rotation count to zero.

An additional feature of the drive assembly 14 is that all of the electronics of the litter box 10 are located within/on the drive assembly 18. This permits the litter tray 12 separated from the drive assembly 14, and be cleaned without damaging the electronics in the drive assembly 14. Specifically, upon separation of the drive assembly 14 from the litter tray 12, the litter tray 12 can be moved to a separate location for cleaning, for example, outdoors with the use of a garden hose.

All references cited herein are expressly incorporated by reference in their entirety.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A self-cleaning litter box comprising
a litter tray including a bottom surface, a first and second side wall, a home end, and a discharge end, the bottom surface having an upwardly sloping ramp directed towards the discharge end;
a carriage assembly supported between the first and second side walls, and including a rake positioned thereon;
a drive assembly removably attached to the home end of the litter tray, the drive assembly is separate from, but operably connected to the carriage assembly to drive the carriage assembly along a path between the home end and discharge end of the litter tray; and
a waste receptacle positioned adjacent to the discharge end of the litter tray, the waste receptacle includes a selectively openable lid.

2. A self-cleaning litter box comprising
a litter tray including a bottom surface, a first and second side wall, a home end, and a discharge end; the bottom surface having an upwardly sloping ramp directed towards the discharge end;
a carriage assembly supported between the first and second side walls, and including a rake positioned thereon;
a drive assembly removably attached to the home end of the litter tray, the assembly operably connected to the carriage assembly to drive the carriage assembly along a path between the home end and discharge end of the litter tray;
a waste receptacle positioned adjacent to the discharge end of the litter tray, the waste receptacle includes a selectively openable lid, and
a first drive screw positioned along the first side wall of the litter tray, wherein an end of the first drive screw is operably connected to the drive assembly.

3. A self cleaning litter box as set forth in claim 2, further comprising a second drive screw positioned along the second side wall of the litter tray, wherein an end of the second drive screw is operably connected to the drive assembly.

4. A self cleaning litter box as set forth in claim 3, wherein drive assembly includes a drive motor connected to a drive gear.

5. A self cleaning litter box as set forth in claim 4, wherein the home end of the litter tray includes a drive coupler operably connected to the first and second drive screws, the drive gear of the drive assembly engaging the drive coupler when the drive assembly is mounted to the home end of the litter tray.

6. A self cleaning litter box as set forth in claim 5, wherein the drive assembly further comprises a locking assembly for removably securing the drive assembly to the home end of the litter tray.

7. A self cleaning cat litter box as set forth in claim 5, further comprising a control system including a processor and control panel, the control system operably connected to the drive motor.

8. A self cleaning cat litter box as set forth in claim 7, wherein the control system includes a timer selector for setting a time interval between cleaning cycles.

9. A self cleaning litter box as set forth in claim 8, wherein the control system is mounted in the drive assembly.

10. A self cleaning litter box as set forth in claim 8, further comprising a cat presence sensor connected to the processor, wherein if the cat presence sensor detects a cat in the litter tray within a predetermined time before the initiation of the cleaning cycle the cleaning cycle is skipped.

11. A self cleaning litter box as set forth in claim 10, wherein the cat presence senor is mounted on the drive assembly.

12. A self cleaning cat litter box as set forth in claim 1, wherein the drive assembly is removably mounted to an outer wall of the home end of the litter tray.

13. A self cleaning litter box as set forth in claim 12, wherein at least a portion of the waste receptacle is position under the waste end of the litter tray.

14. A self-cleaning litter box comprising
 a litter tray including a bottom surface, a first and second side wall, a home end, and a discharge end, the bottom surface having an upwardly sloping ramp directed towards the discharge end;
 a pair of drive screws each positioned along a respective one of the first and second side walls of the litter tray,
 a drive coupler positioned at the home end of the litter tray and operably connected to the pair of drive screws,
 a carriage assembly supported between the first and second side walls, and including a rake positioned thereon, the carriage assembly connected to the drive screws, where a rotation of the drive screws drive the carriage assembly along a path between the home end and discharge end of the litter tray;
 a drive assembly removably attached to the home end of the litter tray, the drive assembly including a drive motor connected to a drive gear, wherein the drive gear engages the drive coupler when the drive assembly is mounted to the home end of the litter tray; and
 a waste receptacle positioned adjacent to the discharge end of the litter tray, the waste receptacle includes a selectively openable lid.

15. A self cleaning cat litter box as set forth in claim 14, the drive assembly further comprising a control system including a processor, a control panel, a sensor assembly, wherein the processor operably connects the control panel and sensor assembly to the drive motor.

16. A self cleaning cat litter box as set forth in claim 15, wherein the control system includes a timer selector for setting a time interval between cleaning cycles.

17. A self cleaning litter box as set forth in claim 16, wherein if the sensor assembly detects a cat in the litter tray within a predetermined time before the initiation of a cleaning cycle the cleaning cycle is skipped.

* * * * *